(12) United States Patent
Walpole

(10) Patent No.: US 7,451,436 B2
(45) Date of Patent: Nov. 11, 2008

(54) AGGREGATE HANDLING OF OPERATOR OVERLOADING

(75) Inventor: Shawn D. Walpole, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 596 days.

(21) Appl. No.: 10/995,441

(22) Filed: Nov. 23, 2004

(65) Prior Publication Data

US 2006/0130025 A1 Jun. 15, 2006

(51) Int. Cl.
G06F 9/44 (2006.01)
G06F 9/45 (2006.01)

(52) U.S. Cl. .................. 717/141; 717/107; 717/108; 717/109; 717/154

(58) Field of Classification Search .................. None
See application file for complete search history.

(56) References Cited

U.S. PATENT DOCUMENTS

| | | | |
|---|---|---|---|
| 5,301,301 A | 4/1994 | Kodosky et al. | |
| 5,485,600 A | 1/1996 | Joseph et al. | |
| 5,732,277 A | 3/1998 | Kodosky et al. | |
| 5,821,934 A | 10/1998 | Kodosky et al. | |
| 5,822,751 A * | 10/1998 | Gray et al. | 707/3 |
| 5,850,548 A | 12/1998 | Williams | |
| 5,995,916 A | 11/1999 | Nixon et al. | |
| 6,216,138 B1 | 4/2001 | Wells et al. | |
| 6,292,810 B1 | 9/2001 | Richards | |
| 6,366,300 B1 | 4/2002 | Ohara et al. | |
| 6,437,805 B1 | 8/2002 | Sojoodi et al. | |
| 6,789,216 B2 * | 9/2004 | Zagorski et al. | 714/38 |
| 6,857,118 B2 | 2/2005 | Karr et al. | |
| 6,868,526 B2 | 3/2005 | Singh | |
| 6,880,130 B2 | 4/2005 | Makowski et al. | |
| 6,976,222 B2 | 12/2005 | Sojoodi et al. | |
| 6,996,694 B1 * | 2/2006 | Muthukkaruppan | 711/170 |
| 2002/0196285 A1 | 12/2002 | Sojoodi et al. | |
| 2003/0172369 A1 | 9/2003 | Kodosky et al. | |

(Continued)

OTHER PUBLICATIONS

Oracle(R) Data Developers Guide copyright 1996 7 pages.*

(Continued)

*Primary Examiner*—Chuck O Kendall
(74) *Attorney, Agent, or Firm*—Meyertons Hood Kivlin Kowert & Goetzel, P.C.; Jeffery C. Hood; Mark S. Williams

(57) ABSTRACT

System and method for aggregate handling of operator overloading. A program is created, including an aggregate comprising multiple data elements of one or more data types, and an operator applied to the aggregate. At least one of the data types is user-defined, and specifies a user-defined operator function for the operator. The aggregate is analyzed to determine one or more operator functions implementing the operator for the data elements, and executable code invoking the one or more operator functions for the plurality of data elements generated, e.g., for each data element in the aggregate: if the data type of the data element specifies an operator function for the operator, executable code invoking the function may be generated, and if not, then if the data element is another aggregate, the analyzing/generating is performed for the other aggregate, and if the data element is not an aggregate, an error may be indicated.

20 Claims, 9 Drawing Sheets

U.S. PATENT DOCUMENTS

2003/0234802 A1    12/2003    Makowski et al.
2004/0046806 A1    3/2004    Makowski et al.

OTHER PUBLICATIONS

Bjarne Stroustrup, "The C++ Programming Language—Second Edition," AT7T Bell Telephone Laboratories, Incorporated, 1991, (pp. 585-594).

Bjarne Stroustrup; "The C++ Programming Language—Second Edition," 1991; pp. 585-594; AT&T Bell Telephone Laboratories, Inc.

U.S. Appl. No. 09/569,863, entitled "System and Method for Enabling Graphical Program Polymorphism", filed May 12, 2000, by Duncan Hudson and Erica Rokicki Bono.

Mattias Ericsson; "GOOP History by Mattias Ericsson"; Jul. 1, 2003; 2 pages; Retrieved from the Internet: www.openg.org/tiki/tiki-index.php?page=GOOP+History+by+Mattias+Ericsson.

Jorgen Jehander; "Graphical Object-Oriented Programming in LabView"; Application Note 143; Oct. 1999; 16 pages; National Instruments Corporation, Austin, TX.

Jim Kring; "OpenGOOP—a component framework"; Jun. 3, 2003; 36 pages.

* cited by examiner

AGGREGATE HANDLING OF OPERATOR OVERLOADING

FIELD OF THE INVENTION

The present invention relates to the field of programming, and more particularly to a system and method for aggregate handling of operator overloading.

DESCRIPTION OF THE RELATED ART

Software programs and programming have become ubiquitous in the modern world, finding application in virtually all fields, including for example, industrial applications such as automated design, testing, and manufacturing, as well as financial, scientific, and entertainment applications, among others. Many different techniques and tools for programming have been developed, including for example, high level text-based programming languages such as BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

In the late 1970's and early 1980's, object oriented programming (OOP) was developed, based on the central idea of an object. Objects comprise data that can be packaged and manipulated by the programmer, as well as methods (or functions) which operate on the data. Generally, object classes or data types are defined, specifying one or more data fields, e.g., member variables, and/or associated functions, e.g., member functions or methods. Classes or data types may be intrinsic to a language, or may be user-defined. Objects are then instantiated based on the defined classes and used to create object-oriented programs. Examples of object oriented programming languages include Smalltalk, C++, JAVA, and ADA, among others.

In some versions of OOP, classes may be derived from other classes, where, for example, a child class inherits the member variables or fields and functions or methods from a parent class. Additional variables and functions may be added to the child class as desired. Some languages also support features such as function overloading, where a child class defines a function with the same name as one of its parent class functions, and where the child function overrides the parent function. Some languages also support operator overloading, where intrinsic or primitive operations such as, for example, "+", "−", "*", and "/" (i.e., plus, minus, and multiplication, and division) may be defined for user-defined classes, and invoked via the operator symbol, e.g., "A+A", where A is a user-defined data type. The term "primitive" refers to basic operations supported by the programming language which may be combined to create more complex operations, which may be packaged as functions, procedures, and methods In many applications, multiple objects may be aggregated, e.g., into arrays and structures, also referred to as clusters. For example, a program may use an array of objects, where each object is of the same data type, or a collection or cluster of objects, where the objects may be of the same type or of different types. Generally, if operators are to be applied to such aggregates of objects, the programmer is required to either define the operator, e.g., in the case where the aggregate is a structure or class, i.e., implement operator overloading for the aggregate, or code the processing of the aggregate directly in the program. In other words, the programmer must either overload the operator for the aggregate (class or structure), where the overloaded operator function presumably applies the operation correctly to the various member data in the aggregate, or the programmer must include program instructions in the program to correctly apply the operation to the contents of the aggregate (class, structure, or array). This, a substantial amount of programming may be required to apply operations to aggregates of objects.

SUMMARY OF THE INVENTION

One embodiment of the present invention comprises a system and method for automatic operator overloading for aggregates of data types or objects. Note that the functionality and techniques disclosed herein are implemented in and performed by embodiments of a programming development environment, including a programming language. In other words, the method describes functionality intrinsic to the language/environment, rather than functionality developed by an end user.

A program may be created, where the program includes an aggregate, and an operator applied to the aggregate. In other words, the program may include one or more aggregate data structures, e.g., clusters or arrays, where each aggregate includes a plurality of data elements, of one or more data types. A data element in the aggregate may itself be another aggregate. In some languages and/or embodiments, a data element may be an object instantiated from a specified class, as is well known to those skilled in the art of object oriented programming (OOP). Note that in some embodiments, arrays and/or clusters may be considered to have "public" data elements, i.e., the data elements may be accessible by other processes and/or objects. Note also that the program may be any type of program, e.g., a text-based program, such as in C, C++, JAVA, etc., or a graphical program, such as in the "G" programming language provided by National Instruments Corporation.

The operator applied to the aggregate or aggregates may be any type of operator provided by the programming environment or language, or in some embodiments may be user-defined. Examples of operators include "+", "−", "*", and "++", as well as Boolean and relational operators, among others. For example, the operator may be a unary operator, or a binary operator. For example, a binary operator may operate on the aggregate, and a different aggregate, a data element of an intrinsic data type, or a data element of a user-defined data type. In some embodiments, at least one of the one or more data types comprises a user-defined data type specifying a user-defined operator function for the operator. In one embodiment, the operator may be an intrinsic operator, i.e., included in the language, where the user-defined operator function for the operator may be an overloaded operator function for the operator. Note that as used herein, an operator function refers to program instructions or code that implements and/or performs functionality of a corresponding operator.

The aggregate may then be analyzed. More specifically, each data element included in the aggregate may be analyzed to determine if it has a specified operator function for the operator being applied to the aggregate. In other words, the method may determine whether the data element's data type specifies an operator function implementing the operator for that data type. Note that in cases where a data element is itself an aggregate, referred to herein as a "sub-aggregate", the sub-aggregate may be analyzed in the same manner. In various embodiments, the aggregate and its sub-aggregates (and any of their sub-aggregates, etc.) may be processed recursively, or iteratively. In some embodiments, there may be a plurality of aggregates included in the program, with an operator applied to each (the operators may be of the same type, or different from the operator mentioned above), in which case the method may include analyzing each of the aggregates in similar fashion.

Executable code invoking respective operator functions on data elements that have specified operator functions may be automatically generated. In other words, for each data element with a well-defined operator function, the method may insert an invocation of that operator function on the data element in the executable code of the program. In some embodiments, the generation of the executable code may be considered part of the analysis described above.

In preferred embodiments, the analysis and/or code generation described above may be performed at compile time, e.g., as part of the compilation process.

In various embodiments, the aggregate and its sub-aggregates (and any of their sub-aggregates, etc.) may be processed recursively, or iteratively. A recursive approach to the analysis and code generation is now described.

The method may determine a next aggregate of the program. If there are no more aggregates, the method may terminate. If there is another aggregate, the method may determine whether there are further data elements to process in the aggregate. If there are no more data elements in the aggregate to process, the method may proceed to the next aggregate, if there is one. In other words, if there are no more data elements to process in the current aggregate, the method may determine if there are further aggregates to process, as described above. If there are further data elements to process, the method may process the next data element of the aggregate.

The method may determine whether the data type of the data element specifies an operator function for the operator. If the data type of the data element does specify an operator function for the data type, the method may automatically generate executable code invoking the operator function. In other words, if the data type of the data element has an associated operator function implementing the operator for the data type, the method may insert an invocation of that operator function in the executable code of the program, e.g., as part of the compilation process.

If it is determined that no operator function is defined or specified for the data type of the data element, then the method may determine whether the data element is an aggregate. If the data element is not an aggregate, an error may be returned, e.g., an error condition may obtain. If, however, the data element is determined to be an aggregate, i.e., another aggregate, i.e., a sub-aggregate, the sub-aggregate may be processed as described above, where the analysis/generation described above is applied to a different aggregate (or sub-aggregate). In other words, the above-described method may be performed recursively on the sub-aggregate.

The method may then proceed, processing each data element of the sub-aggregate, and continuing as described above until all aggregates and their respective data elements have been analyzed and processed, as described above. Note that in this recursive approach, once the sub-aggregate (and any of its sub-aggregates) has been processed, the "next" data element of the "parent" aggregate of the sub-aggregate, i.e., the aggregate whose processing was paused to handle the aggregate(s) contained therein, is processed, and the method continues as described.

As is well known in the art of programming, recursion generally involves a recursion stack, where the program state at the time of the recursive call is stored. For example, in this recursive embodiment, while processing the data elements of an aggregate, upon encountering a sub-aggregate, the system may "push" the program state, i.e., the function state, onto the stack, and process the sub-aggregate. Of course, if the sub-aggregate itself also has an aggregate data element (e.g., a sub-sub-aggregate), the process repeats, processing all of the contained aggregates in depth-first order. Once the sub-aggregate has been processed, the original program state that was stored on the recursion stack is "popped" from the stack, and processing of the aggregate continues.

It should be noted that any recursive process may also be performed in an iterative manner. For example, in an iterative approach, when a sub-aggregate is encountered, instead of making a recursive call to process the sub-aggregate, the method may add the sub-aggregate to a list or queue for processing later, and continue processing the "parent" aggregate. This approach results in breadth-first processing of the data elements, as opposed to the depth-first processing of the recursive approach, as is well known in the art.

The generated code may then be compiled, e.g., as part of the compilation of the program. Once the program has been compiled, the program may be executed, where executing the program may include executing the executable code invoking respective operator functions to apply the operator to each data element whose data type specifies an operator function for the operator.

Thus, the method may "walk" or traverse the aggregate, determining respective operator functions for data elements whose data types specify such functions, walking or traversing any sub-aggregate data elements in the same manner, and returning an error if a data element has no specified operator function and is not itself an aggregate. Thus, after the process is done, if no errors were found, the automatically generated executable code of the program includes those calls to the operator functions that are appropriate for the respective data elements of the aggregate(s), and omits any operator function calls that are not required.

Thus, in various embodiments of the systems and methods described herein, a programming development environment and/or a programming language may include or facilitate automatic aggregate handling of overloaded operators, e.g., for user-defined data types.

BRIEF DESCRIPTION OF THE DRAWINGS

A better understanding of the present invention can be obtained when the following detailed description of the preferred embodiment is considered in conjunction with the following drawings, in which.

Figure 1A:
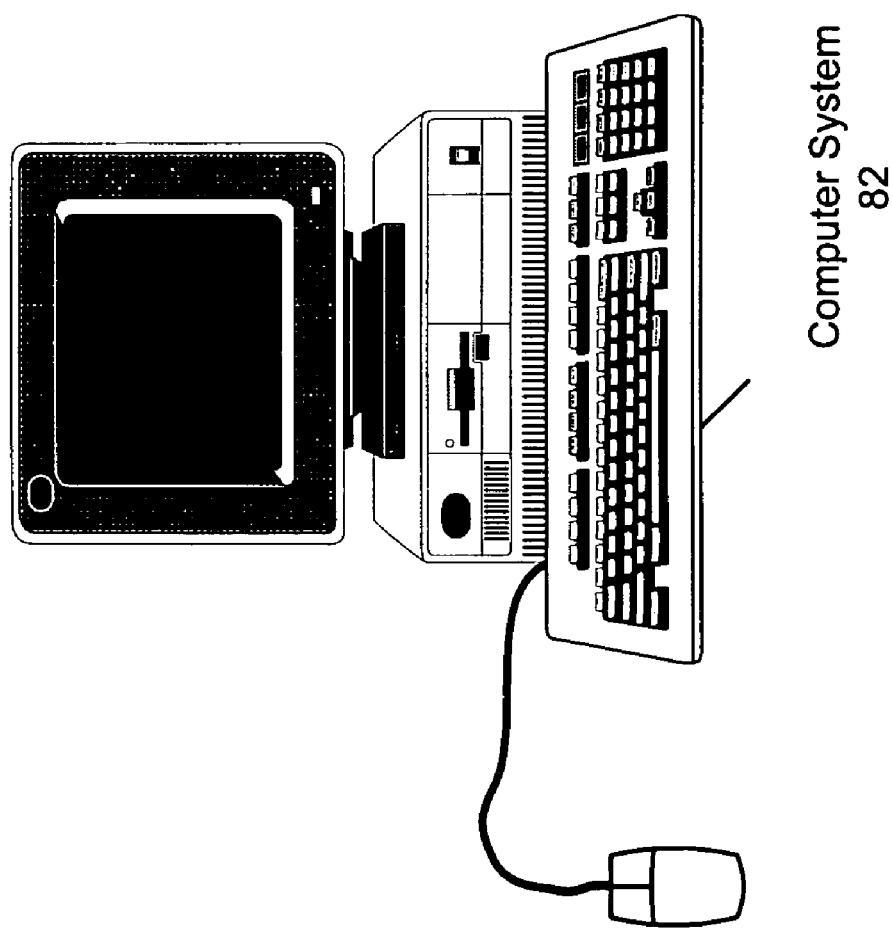
FIG. 1A illustrates a computer system suitable for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Primitive or Intrinsic Operation—basic operations supported by a programming language which may be combined to create more complex operations, which may be packaged as functions, procedures, and methods.

Array—a sequential list structure that includes a variable number of one or more data elements. These elements may be all of the same type (a homogenous array) or of differing types (a heterogeneous array). When the elements are of differing types, there is some common parent type from which all the element types are derived, such that the array can be said to be a homogenous array of that common parent type, e.g., an array of dogs may include many types of dogs, such as German shepherds, Cocker Spaniels and Dalmatians.

Cluster—a structure that includes a fixed number of multiple data elements, optionally of different data types.

Aggregate—a structure or collection of data elements, i.e., an array or cluster. Note that an aggregate may include other aggregates, i.e., a data element in the aggregate may itself be another aggregate, and so the structure may involve a hierarchy of any depth.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc. Graphical software programs which perform data acquisition, analysis and/or presentation, e.g., for measurement, instrumentation control, industrial automation, modeling, or simulation may be referred to as virtual instruments (VIs).

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

> A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute program instructions implementing embodiments of the present invention. One embodiment of a method for aggregate handling of operator functions is described below.

As shown in FIG. 1A, the computer system 82 may include a display device operable to display an interface, such as a graphical user interface (GUI), facilitating interactions between a user and software executing on the computer system 82. For example, the graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., text-based programs or graphical programs, which are executable to perform the methods described herein. Also, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 1B:
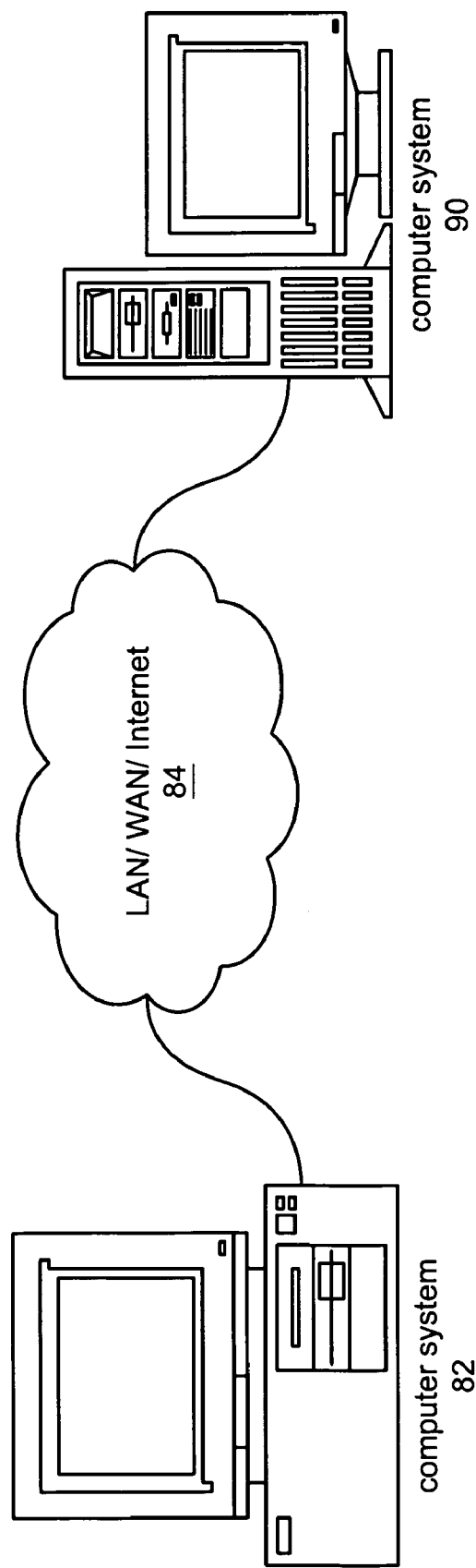
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the user interface of a program and computer system 90 may execute the functional or application portion of the program.

In some embodiments, the program development environment may be the LabVIEW graphical program development environment provide by National Instruments Corporation, and the programs described herein may be graphical programs developed in the "G" graphical programming language also provided by National Instruments Corporation. For example, as described above in the glossary of terms, a graphical program comprises a plurality of interconnected nodes or icons, wherein the plurality of interconnected nodes or icons visually indicate functionality of the program. These interconnected nodes form a block diagram. In some cases, the graphical program may also include a user interface portion, referred to as a front panel, which includes one or more controls or indicators for human interaction with the program. Further details regarding graphical programming may be found in U.S. Pat. No. 4,914,568 titled "Graphical System for Modeling a Process and Associated Method", U.S. Pat. No. 5,481,741 titled "Method and Apparatus for Providing Attribute Nodes in a Graphical Data Flow Environment", U.S. Pat. No. 6,173,438 titled "Embedded Graphical Programming System", U.S. Pat. No. 6,219,628 titled "System and Method for Configuring an Instrument to Perform Measurement Functions Utilizing Conversion of Graphical Programs into Hardware Implementations", and U.S. Patent Application Publication No. 20010020291 (Ser. No. 09/745,023) titled "System and Method for Programmatically Generating a Graphical Program in Response to Program Information", each of which was incorporated by reference above.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
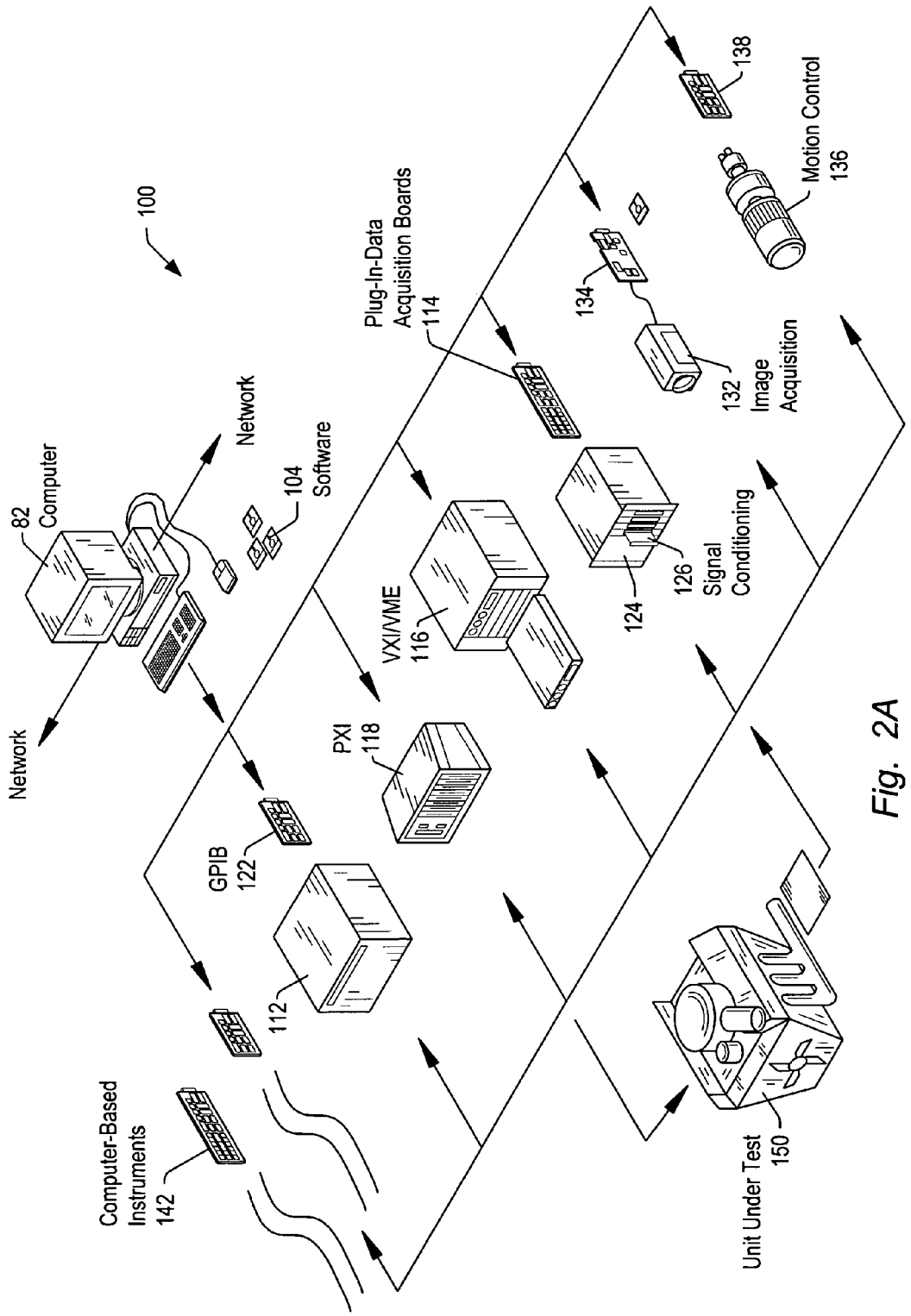
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others. While the techniques described herein are illustrated in terms of various industrial applications, it should be noted that they are broadly applicable to any program application or domain.

Figure 2B:
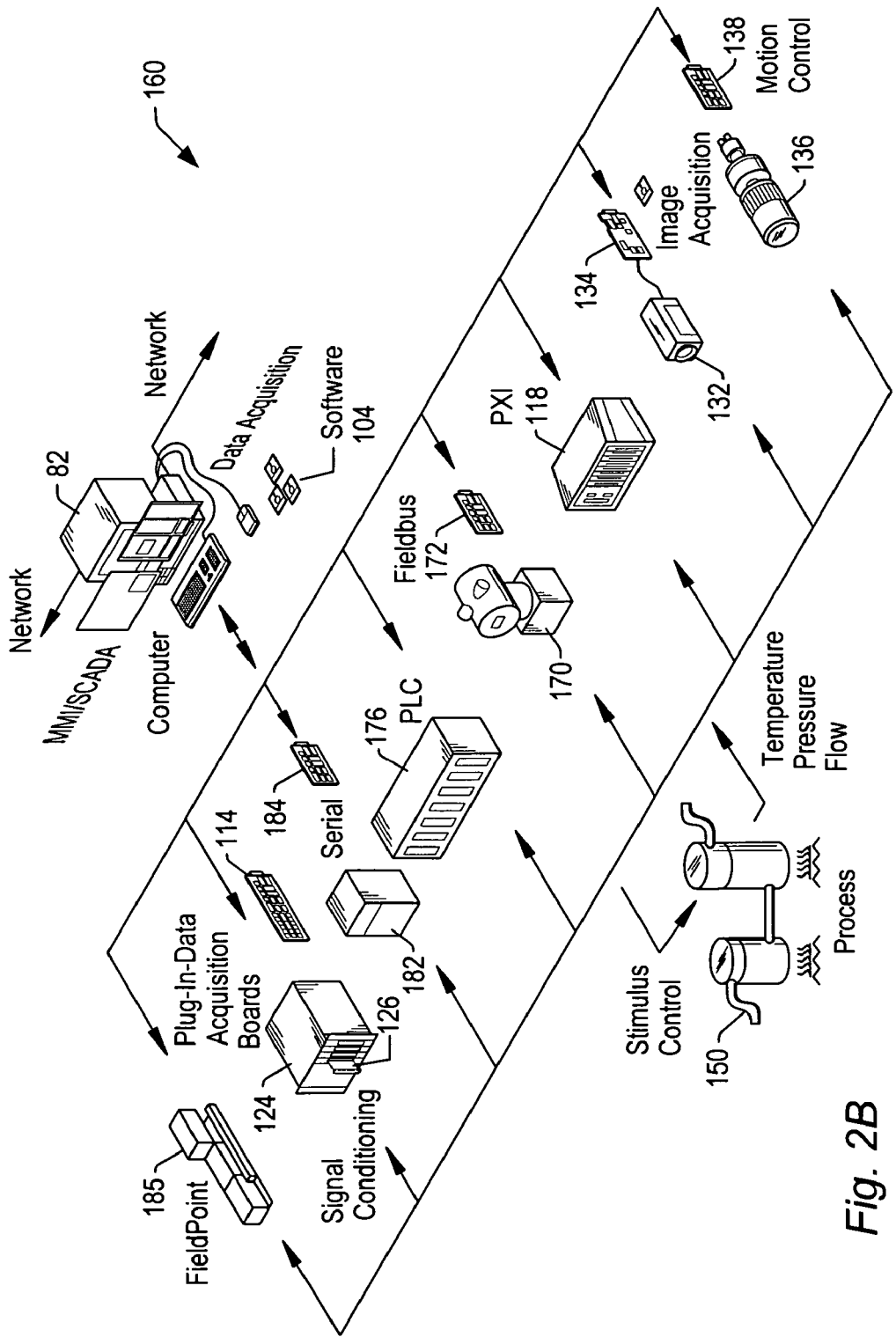
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3:
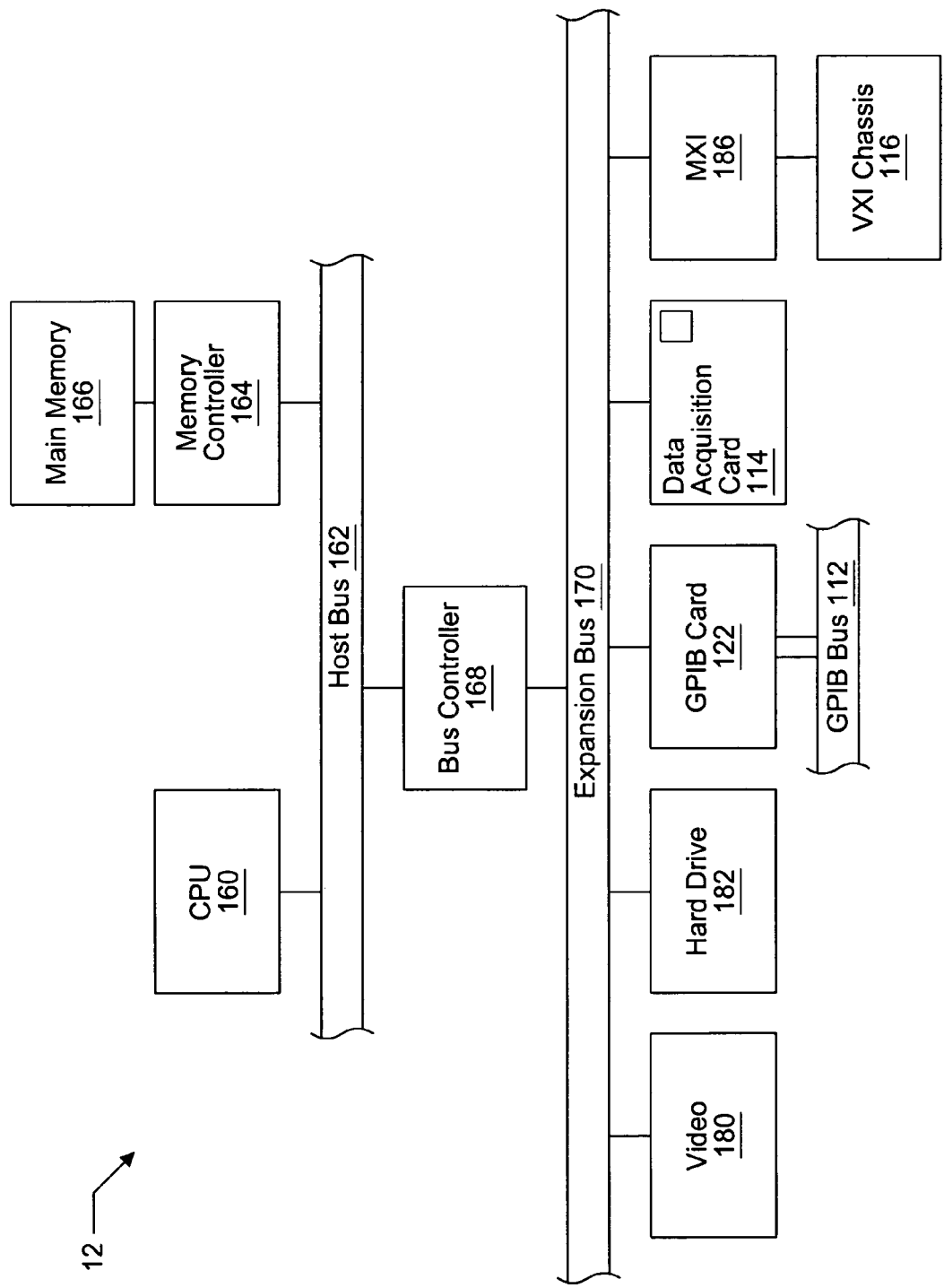
FIG. 3 is an exemplary block diagram of the computer systems of FIGS. 1A, 1B, 2A and 2B.

FIG. 3—Computer System Block Diagram

FIG. 3 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a program development environment and one or more programs in accordance with various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of a text-based program, or may comprise a graphical program. The deployed graphical program may comprise graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4A:
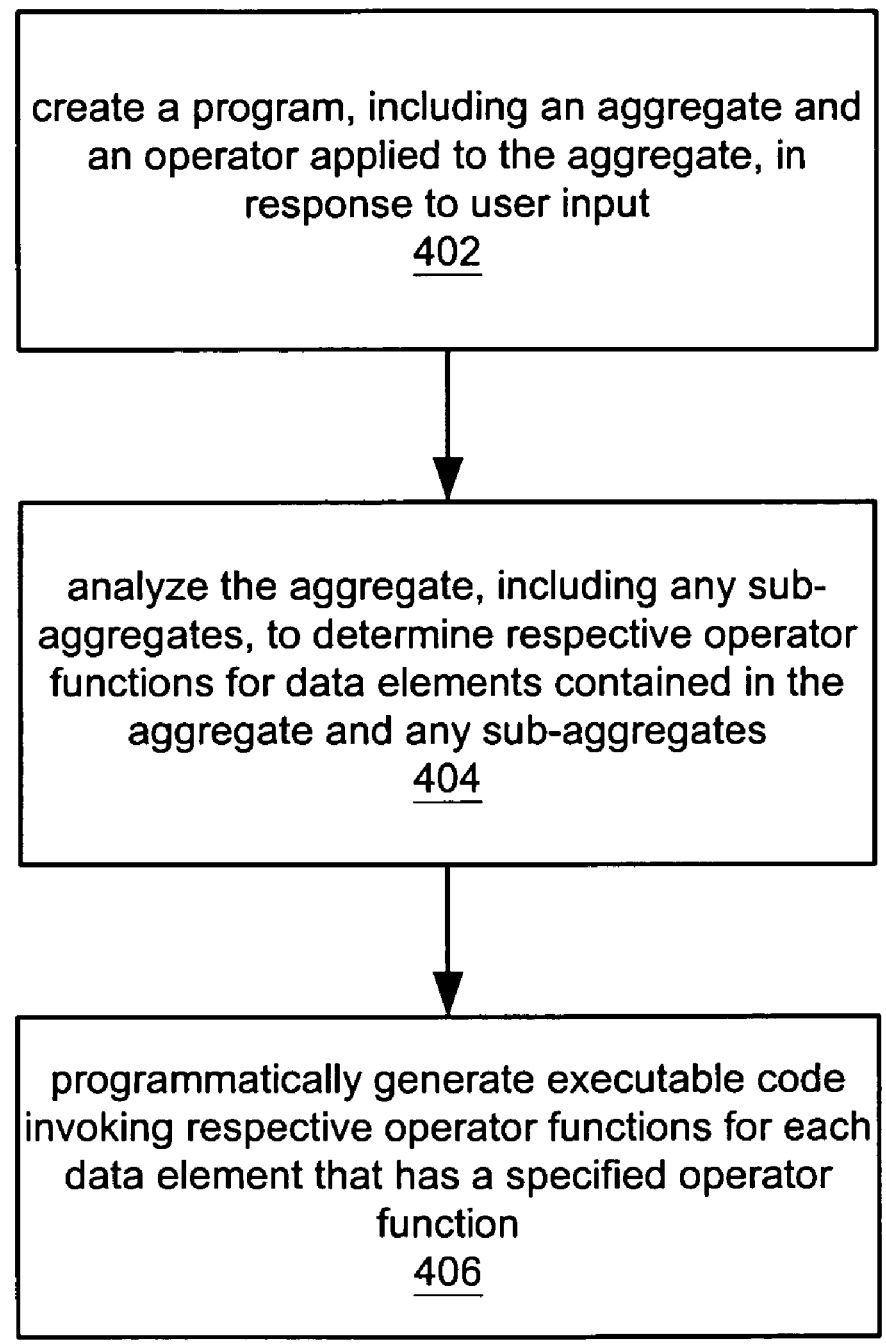
FIGS. 4A and 4B flowchart embodiments of a method for aggregate handling of operator overloading.
Figure 4B:
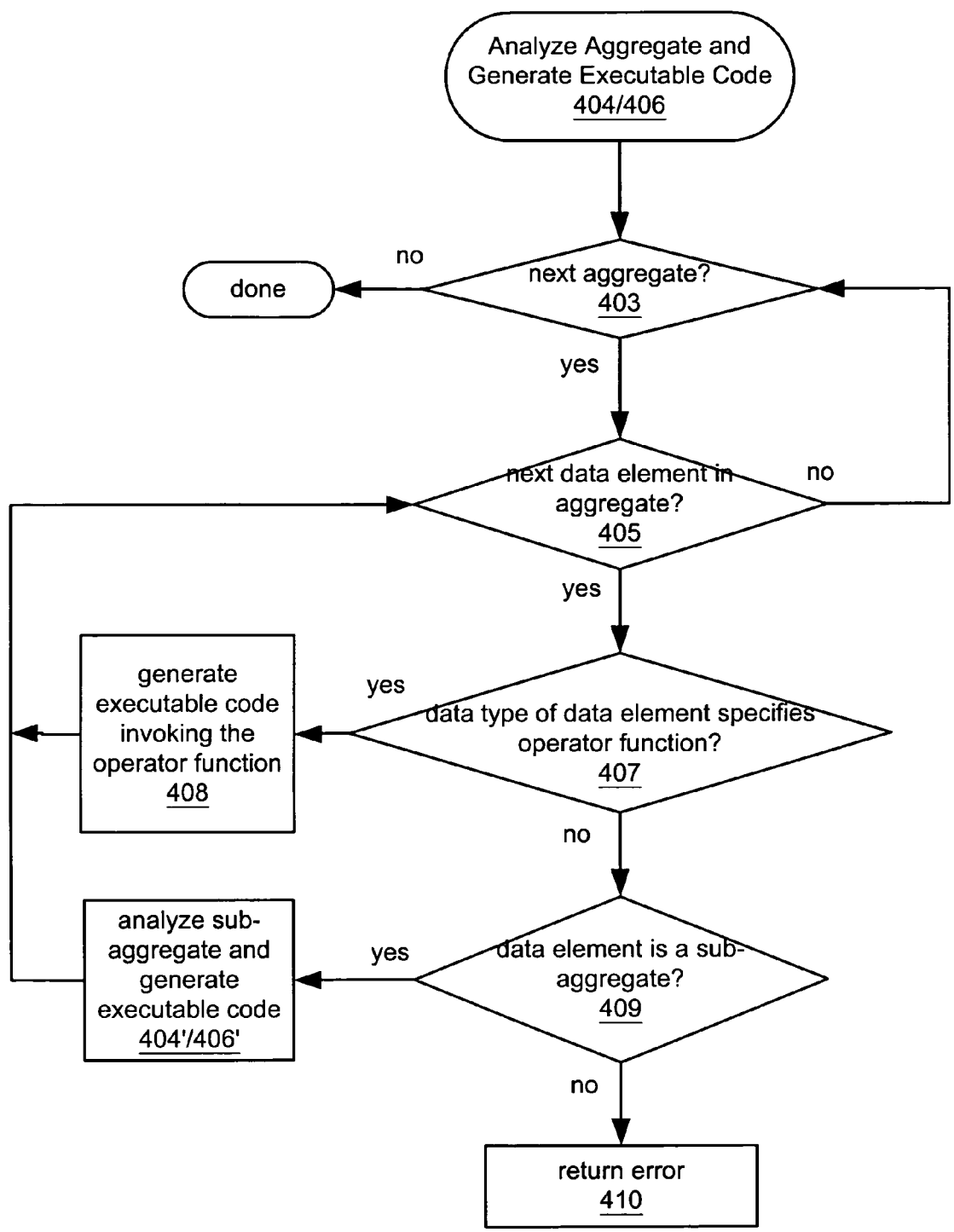

FIGS. 4A and 4B—Method for Aggregate Handling of Operator Overloading

FIGS. 4A and 4B illustrate embodiments of a method for aggregate handling of operator overloading, where the functionality described is implemented in and performed by embodiments of a programming development environment, including a programming language. In other words, the method describes functionality intrinsic to the language/environment, rather than functionality developed by an end user. The methods shown in FIGS. 4A and 4B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 402, a program may be created, where the program includes an aggregate, and an operator applied to the aggregate. In other words, the program may include one or more aggregate data structures, e.g., clusters or arrays, where each aggregate includes a plurality of data elements, of one or more data types. As noted above, a data element in the aggregate may itself be another aggregate. In some languages and/or embodiments, a data element may be an object instantiated from a specified class, as is well known to those skilled in the art of OOP. Note that in some embodiments, arrays and/or clusters may be considered to have "public" data elements, i.e., the data elements may be accessible by other processes and/or objects.

The operator applied to the aggregate or aggregates may be any type of operator provided by the programming environment or language, or may be user-defined. Examples of operators include "+", "−", "*", and "++", as well as Boolean and relational operators, among others. For example, the operator may be a unary operator, or a binary operator. For example, a binary operator may operate on the aggregate, and a different aggregate, a data element of an intrinsic data type, or a data element of a user-defined data type.

In some embodiments, at least one of the one or more data types comprises a user-defined data type specifying a user-defined operator function for the operator. Note that as used herein, an operator function refers to program instructions or code that implements and/or performs functionality of a corresponding operator. In one embodiment, the operator may be an intrinsic operator, i.e., included in the language, where the user-defined operator function for the operator may be an overloaded operator function for the operator.

Note that the program may be any type of program, e.g., a text-based program, such as in C, C++, JAVA, etc., or a graphical program, such as in the "G" programming language provided by National Instruments Corporation. Further information regarding graphical programs and programming is provided below.

In 404, the aggregate may be analyzed. More specifically, each data element included in the aggregate may be analyzed to determine if it has a specified operator function for the operator being applied to the aggregate. In other words, the method may determine whether the data element's data type specifies an operator function implementing the operator for that data type. Note that in cases where a data element is itself an aggregate, referred to herein as a "sub-aggregate", the sub-aggregate may be analyzed in the same manner. In various embodiments, the aggregate and its sub-aggregates (and any of their sub-aggregates, etc.) may be processed recursively, or iteratively. In some embodiments, there may be a plurality of aggregates included in the program, with an operator applied to each (the operators may be of the same type, or different from the operator mentioned above), in which case the method may include analyzing each of the aggregates in similar fashion.

In some embodiments, method element 406, described below, may be considered part of the analysis of 404.

In 406, executable code invoking respective operator functions on data elements that have specified operator functions may be automatically generated. In other words, for each data element with a well-defined operator function, the method may insert an invocation of that operator function on the data element in the executable code of the program.

It should be noted that in preferred embodiments, method elements 404-406 may be performed at compile time, e.g., as part of the compilation process.

As noted above, in various embodiments, the aggregate and its sub-aggregates (and any of their sub-aggregates, etc.) may be processed recursively, or iteratively. FIG. 4B flowcharts one embodiment of a method that performs the functionality of method elements 404-406 of FIG. 4A in a recursive manner. As noted above, in various embodiments, some of the method elements shown may be performed concurrently, in a different order than shown, or may be omitted. Additional method elements may also be performed as desired.

As FIG. 4B shows, in 403, the method may determine a next aggregate of the program. If there are no more aggregates, the method may terminate, as shown by the "done" block. If there is another aggregate, the method may proceed with 405, described below.

In 405, the method may determine whether there are further data elements to process in the aggregate. If there are no more data elements in the aggregate to process, the method may proceed to 403, as shown. In other words, if there are no more data elements to process in the current aggregate, the method may determine if there are further aggregates to process, as described above in 403. If there are further data elements to process, the method may process the next data element of the aggregate, as shown in 407 and described below.

In 407, the method may determine whether the data type of the data element specifies an operator function for the operator. If the data type of the data element does specify an operator function for the data type, then in 408, the method may automatically generate executable code invoking the operator function. In other words, if the data type of the data element has an associated operator function implementing the operator for the data type, the method may insert an invocation of that operator function in the executable code of the program, e.g., as part of the compilation process.

If in 407 it is determined that no operator function is defined or specified for the data type of the data element, then the method may determine whether the data element is an aggregate, as indicated in 409. If the data element is not an aggregate, an error may be returned, e.g., an error condition may obtain, as indicated in 410.

If, however, the data element is determined to be an aggregate, i.e., another aggregate, i.e., a sub-aggregate, the sub-aggregate may be processed as described above, as indicated by 404'/406' (404-prime/406-prime), where the 'prime' indicates that this is the same analysis/generation performed above, but on a different aggregate (or sub-aggregate). In other words, the above-described method may be performed recursively on the sub-aggregate.

The method may then proceed with 405, as shown, processing each data element of the sub-aggregate, and continuing as described above until all aggregates and their respective data elements have been analyzed and processed, as described above. Note that in this recursive approach, once the sub-aggregate (and any of its sub-aggregates) has been processed, the "next" data element of the "parent" aggregate of the sub-aggregate, i.e., the aggregate whose processing was paused to handle the aggregate(s) contained therein, is processed in 405, and the method continues as described.

As is well known in the art of programming, recursion generally involves a recursion stack, where the program state at the time of the recursive call is stored. For example, in this recursive embodiment, while processing the data elements of an aggregate, upon encountering a sub-aggregate, the system may "push" the program state, i.e., the function state, onto the stack, and process the sub-aggregate. Of course, if the sub-aggregate itself also has an aggregate data element (e.g., a sub-sub-aggregate), the process repeats, processing all of the contained aggregates in depth-first order. Once the sub-aggregate has been processed, the original program state that was stored on the recursion stack is "popped" from the stack, and processing of the aggregate continues.

It should be noted that any recursive process may also be performed in an iterative manner. For example, in an iterative approach, when a sub-aggregate is encountered, instead of making a recursive call to process the sub-aggregate, the method may add the sub-aggregate to a list or queue for processing later, and continue processing the "parent" aggregate. This approach results in breadth-first processing of the data elements, as opposed to the depth-first processing of the recursive approach, as is well known in the art.

Thus, summarizing one embodiment of FIGS. 4A and 4B, the program development environment may be operable to perform: creating a program in response to user input, wherein the program includes an aggregate comprising a plurality of data elements of one or more data types, wherein the program further includes an operator applied to the aggregate; a) analyzing the aggregate, and b) in response to said analyzing, for each data element in the aggregate: b1) if said analyzing determines that the data type of the data element specifies an operator function for the operator for the data type, generating executable code invoking the operator function; and b2) if said analyzing determines that the data type of the data element does not specify an operator function for the operator, determining if the data element is another aggregate; if the data element is another aggregate, performing a) and b) on the other aggregate; and if the data element is not an aggregate, indicating an error. As noted above, in preferred embodiments, a) and b) are performed at compile-time. As also noted above, in some embodiments, a) and b) may be performed for each aggregate in a recursive manner, while in other embodiments, a) and b) may be performed for each aggregate in an iterative manner.

Once the program has been compiled, the program may be executed, where executing the program may include executing the executable code invoking respective operator functions to apply the operator to each data element whose data type specifies an operator function for the operator. In other words, in various embodiments, the method may "walk" or traverse the aggregate, determining respective operator functions for data elements whose data types specify such functions, walking or traversing any sub-aggregate data elements in the same manner, and returning an error if a data element has no specified operator function and is not itself an aggregate. Thus, after the process is done, if no errors were found, the automatically generated executable code of the program includes those calls to the operator functions that are appropriate for the respective data elements of the aggregate(s), and omits any operator function calls that are not required.

Graphical Programs and Programming

As noted above, in some embodiments, the programs described herein may be graphical programs, and the objects may be graphical program objects. A graphical program may be created on the computer system 82 (or on a different computer system) in the following manner.

The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired.

Thus, in various embodiments, when support for a new data type is added to a primitive operator (i.e., a primitive), aggregates or containers, e.g., arrays and clusters, that include the new data type may also be used with the primitive, where, as noted above, the term "aggregates" refers to arrays and/or clusters used to combine basic and/or user-defined data types. Thus, aggregate handling may make user added data types behave more like intrinsic or native data types. Moreover, if a primitive operator that currently performs aggregate handling is overloaded, aggregate handling may still occur automatically in the context of the overloaded operator.

Embodiments of an example implementation of the above-described techniques directed to a graphical programming system are described below.

An Example Implementation

The following describes various embodiments of an implementation of the methods of FIGS. 4A and 4B. More specifically, the embodiments described below are directed to a LabVIEW implementation, although it should be noted that the concepts and techniques described are broadly applicable to any other programming system, as well. It should be noted that the specific features and elements described are intended to be exemplary only, and are not intended to limit the invention to any particular form, function, or appearance. Thus, the techniques described are contemplated as broadly applicable to any type of programming, including both text-based and graphical programming.

In the LabVIEW graphical programming system provided by National Instruments Corporation, primitive operators (primitives) of the language (i.e., the "G" graphical programming language) may be represented by respective nodes or icons that may be included in a graphical program and "wired" to other nodes, terminals, or other graphical program elements that may then provide data for input to the primitive. Examples of such primitive operators are illustrated in FIG. 5.

Figure 5:
FIG. 5 illustrates various example primitive operator nodes, according to one embodiment.

The graphical programming language or environment may provide operator nodes for a variety of operators, including, as FIG. 5 shows, such operators as (viewed left to right) "add", "add with error", "divide", "greater than", "square root", and "complex decomposition", among others. In these particular examples, the add operator node may receive two inputs, add them, and return a sum of the inputs. The add with errors operator node shown may accept the same inputs as the add operator node, but may also include an "error-in" input, and in addition to the sum output, may include an "error-out" output. If the error-in indicates an error, the node may not "fire", thus preventing erroneous values from being used or computed. Similarly, if performing the addition generates an error, e.g., a divide by zero, the error-out may indicate the error condition, e.g., for use by another node wired to that output. The divide node shown may receive two inputs, i.e., a dividend and a divisor, and may output an integer quotient (labeled "IQ" on the node) and a remainder (labeled "R" on the node). The greater than operator node may receive two values to compare and return a Boolean value indicating whether the first input is greater than the second input. The square root operator node may receive a single input value, and may return the square root of that value. The complex decomposition node may receive a complex value as input, and may return real and imaginary components as respective outputs. It should be noted that the operator nodes shown are exemplary only, and are not intended to limit the operators to any particular set of operators, or to any particular form, function, or appearance.

Note that in various embodiments, icons or nodes like those of FIG. 5, described above, may be intrinsic, or may be VIs created by a designer of a user-defined class.

In some embodiments, when a new data type is defined, e.g., by a user, the user may "overload" one or more intrinsic or primitive operators specifically for the new data type. In other words, the user may define a new operator function corresponding to the intrinsic operator, where the user-defined (overloaded) operator provides the operator functionality for the new data type. Thus, for example, to provide "add" functionality for a new data type A, the user may overload the intrinsic add operator with a user-defined add node that takes two inputs of type A, and returns the sum. For a more specific example, consider a case where the data type A is a waveform: the user may define the add operation to simply concatenate the two input waveforms, or, in another approach, to simply combine the waveforms by adding respective sample values or magnitudes of the waveforms together.

In one embodiment of the LabVIEW implementation described herein, the user may define the overloaded operator functionality by writing a graphical program function, e.g., a VI. In preferred embodiments, the VI for the user defined data type may then be invoked automatically when the operator is applied to an element of that data type, even when the element is embedded in an aggregate data structure (e.g., an array and/or cluster). The functionality that provides this aggregate handling of operator overloading may be referred to as an aggregate handler. Thus, an aggregate handler may be provided for each of a variety of base operator functions.

In one embodiment, one or more of the following may be features and constraints may be provided or maintained for or by the aggregate handler:

1. The aggregate handler may need to know what operator function to use for the base case. In other words, the aggregate handler may need to know the intrinsic operator function which was overloaded by the user.

2. Comparison operators may have the option to support comparing aggregates. For example, in one embodiment, this option may result in a single Boolean output for the comparison operator, indicating a result of comparing the first non-equal elements in the aggregate. Thus, when the compare aggregates option is selected, both inputs should be of the same type and the output is a single Boolean. Special rules may be applied for arrays when the lengths are different (or zero). For example, in one embodiment, if the two arrays differ in length, the output may indicate that the inputs are different, e.g., FALSE.

3. Operators that work with waveforms may have error terminals. If any error occurs, error out may report the error, and the output data may be the default data. For example, in one embodiment, in the case that an array of three waveforms is added to a waveform (via an overloaded add operator node), if the Δt's of the waveforms do not match for the second array, a single error and an empty array of waveforms may be output.

4. Typedef, unit, and other type information may be preserved when appropriate. For example, adding a DBL (double precision floating point value) to a typedef of a DBL may output a typedef of a DBL. In some cases, however, the DBL may be removed, e.g., a typedef of an integer divided by 2 may output a DBL.

Further details of typedef information preservation and maintenance are provided below.

In some embodiments, the aggregate handler may automatically generate bundle and unbundle nodes to handle clusters, and For Loops/While Loops (e.g., with auto indexing) to handle arrays. A bundle node operates to create clusters from various types of elements, while an unbundle node operates conversely, operating to receive a bundle and output the constituent elements. Shift registers may be used to maintain error information.

In some embodiments, one or more restrictions may be placed on aggregate handling. For example, in some embodiments, various overload functions for a particular operator may have different interface, i.e., different numbers of inputs and/or outputs, referred to as terminals. For example, in the case of a comparison operator which in the base function may have two inputs and one output, a user-defined comparison operator function for waveforms may include an extra input, epsilon, indicating an acceptable tolerance or error level for the comparison. Thus, in one embodiment, extra terminals or configuration on the operator functions may not be available when the operator function is used inside an aggregate, e.g., by the aggregate handler. In other words, in cases where an overloaded operator includes additional terminals, such terminals may simply not be accessible by the aggregate handling process.

In other embodiments, such extra terminals may be accommodated by the aggregate handler, e.g., via the use of default values for the extra inputs or outputs, via the use of additional data fields maintained in the data types, and so forth.

Figure 6A:
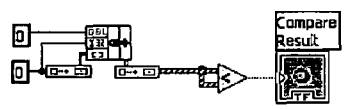
FIG. 6A illustrates one embodiment of an example graphical program that utilizes a comparison operator node.
Figure 6B:
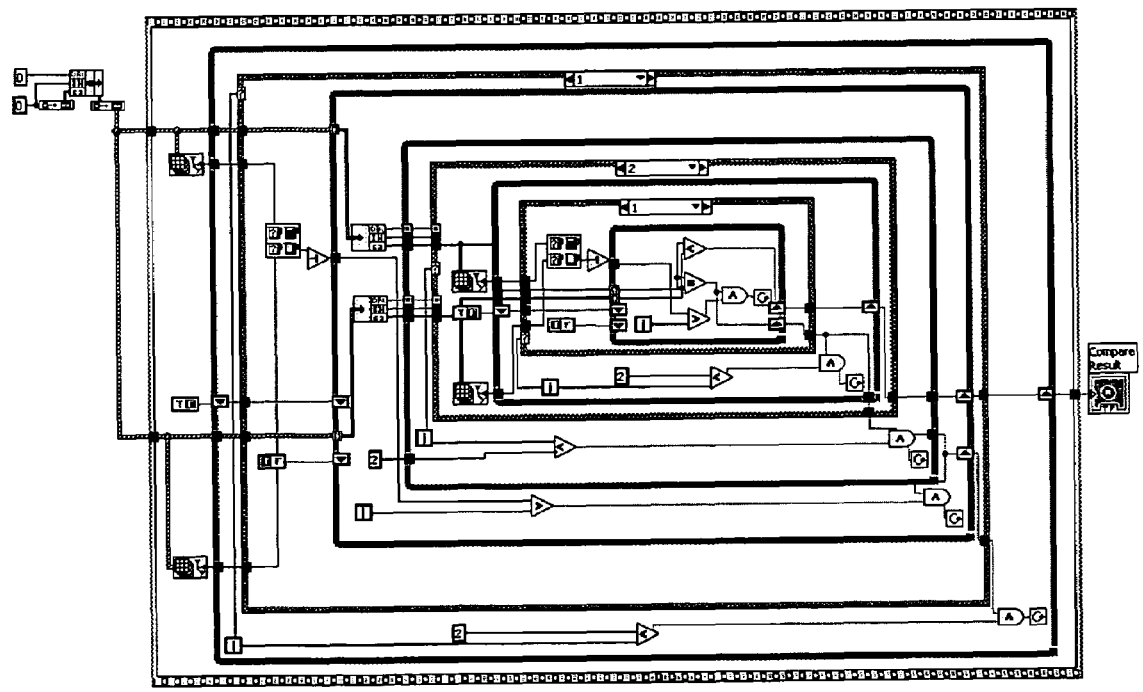
FIG. 6B illustrates one embodiment of programmatically generated code implementing an aggregate handler for the comparison operator of FIG. 6A.

FIGS. 6A and 6B—Example Graphical Program using a Comparison Operator

FIG. 6A illustrates an example graphical program utilizing a comparison operator. More specifically, FIG. 6A illustrates a LabVIEW block diagram that includes a comparison operator node applied to aggregates, where each aggregate is an array of clusters. Note the use of the comparison operator node, indicated by the ">" symbol. The series of nodes to the left of the comparison operator construct the aggregate(s) for input to the comparison operator node.

For example, a first numeric ("0", top left) provides a double as input to a "build cluster" node. A second numeric (also "0", bottom left) provides an integer as another input to the create cluster node, and also provides the integer as input to a "build array" node (bottom, second from left), which operates to make a single element array containing the integer, and passes the single element integer array as a third input to the build cluster node. The build cluster node generates a cluster containing the three inputs, and provides the cluster to another build array node, which makes a single element array containing the cluster. As shown, a wire from this build array node splits, thereby generating a copy of the cluster array, and the two cluster arrays are provided to the comparison operator node for comparison. In other words, in this simple example, the aggregate (the cluster array) is compared to itself.

FIG. 6B illustrates one embodiment of programmatically generated graphical code implementing an aggregate handler for the comparison operator of FIG. 6A. As may be seen, the generated code receives the two aggregates (two copies of the same aggregate) as input, decomposes the aggregates, including decomposing any sub-aggregates, and invokes appropriate comparison operators on the constituent data elements of the aggregates (and sub-aggregates), outputting the final result. As FIG. 6B shows, the block diagram includes various nested case and loop structures that apply specific primitive comparison operators to the various elements included in the aggregate. Thus, the programmatically generated comparison aggregate handler may override the comparison operator function of FIG. 6A in order to process the aggregates appropriately. Note that in some embodiments, the implementation and use of the aggregate handler may be transparent to the user. In other words, the user may not ever see the programmatically generated code (the aggregate handler for the operator).

Figure 7A:
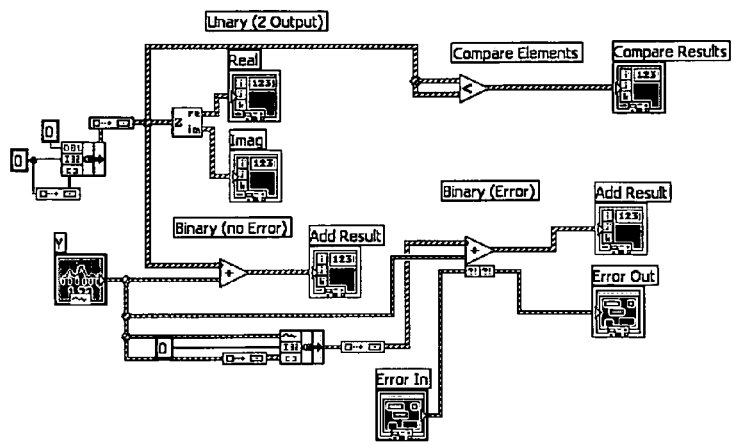
FIG. 7A illustrates one embodiment of a graphical program utilizing multiple operators applied to various aggregates.
Figure 7B:
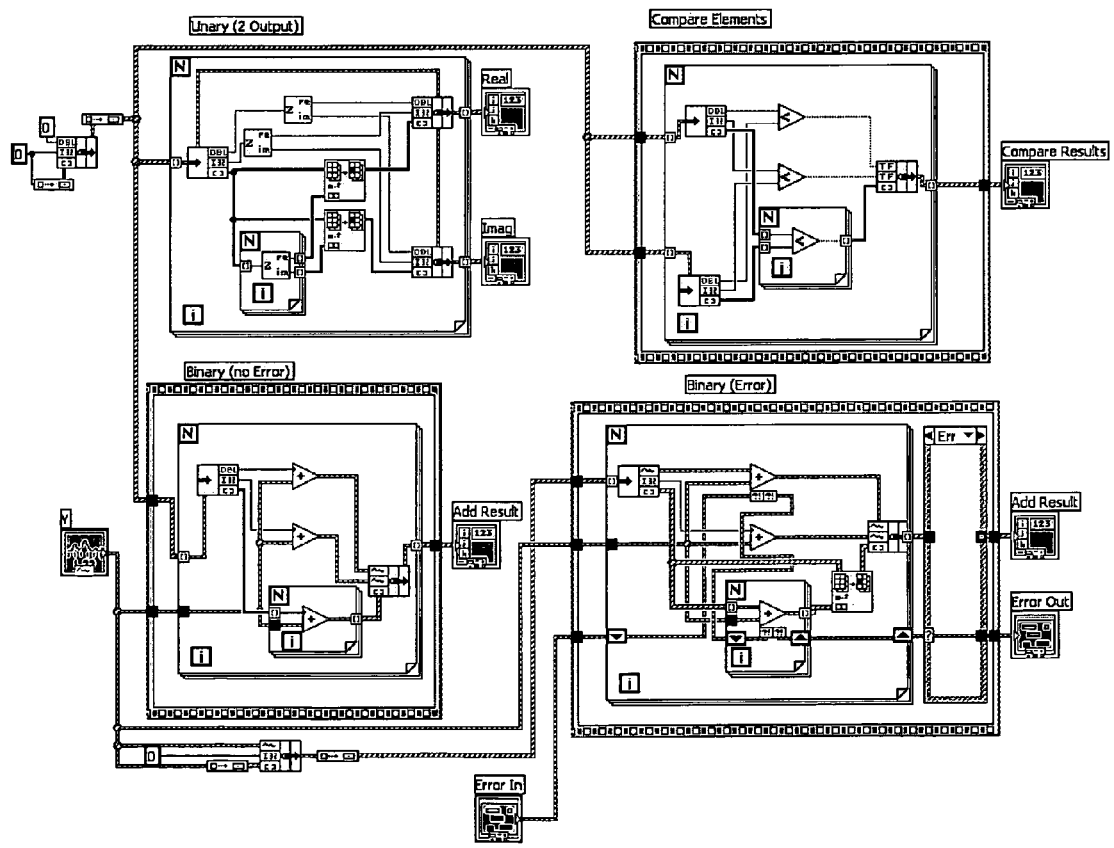
FIG. 7B illustrates one embodiment of programmatically generated code implementing aggregate handlers for the operators of FIG. 7A.

FIGS. 7A and 7B—Example Graphical Program with Multiple Operators

FIG. 7A illustrates one embodiment of a graphical program (block diagram) or VI that includes multiple operators applied to various aggregates. As FIG. 7A shows, as set of nodes similar to the left most nodes of FIG. 6A provides a cluster array as an input to a first portion of the graphical program, while a waveform node provides waveform data as another input to a second portion of the graphical program, where the two portions overlap with respect to an add node, indicated by a "+" symbol, and labeled "Binary (no Error)". As FIG. 7A also shows, the operator nodes used in this example graphical program include "add", "add with error", "compare" (e.g., "less than"), and "complex decomposition", and the various aggregates include arrays, cluster arrays, and clusters, including error clusters.

FIG. 7B illustrates one embodiment of programmatically generated graphical code implementing aggregate handlers for the various operators of FIG. 7A. As FIG. 7B shows, this particular example of generated graphical code is organized in four primary sections relating respectively to a unary operator with two outputs, a compare operator, a binary operator with no error support, and a binary operator with error support. As noted above in reference to FIG. 6B, in some embodiments, the generated code implementing the aggregate handler(s) for operators in a graphical program may be transparent to the user.

Aggregate Handling Rules

In some embodiments, the aggregate handler may implement various rules for applying operator functions to the elements of an aggregate. For example, in one embodiment, the aggregate rules for operator overloading may apply in the following way:

1. Two identical (or numerically convertible) aggregates can be operated together. Operator functions and conversion abilities may determine the convertibility of some aggregates. For example, if an overloadable data type 'D' has an Add operator function that accepts a DBL, then a cluster of 'D' may be added to a cluster of DBL.

2. A scalar may operate on any aggregate as long as each element in the aggregate can operate with the scalar (note that in some embodiments this rule may not apply to compare aggregates). In some embodiments, overloadable data types may be defined as scalars, and may operate on elements within clusters.

3. An array may be operated with its element data type (in some embodiments, this rule may not apply to compare aggregates). The array element may be operated or processed with the data if an operator function exists that accepts the element and the data. For example, overloadable type 'D' may be operated with an array of DBLs, as mentioned above.

4. Measurement data types (e.g., waveform and timestamp data types) may be treated as scalars. Similarly, overloaded data types may be treated as scalars In a particular graphical program, if the wired data types may be handled by an aggregate handler, the handler may replace the current node, e.g., the base primitive operator function node. If at any time the wired data types can no longer be handed by the aggregate handler, a "next best" operator function (or primitive) may replace the aggregate handler. In other words, if for some reason an overloaded operator function may not be used, a closest match for the operator function may be determined based on the user-defined data type, based on, for example, data type promotion or type casting.

In one embodiment, a function may be exported that allows the environment or graphical language (e.g., G code) to determine if an operator function exists for the given wires and operator, and so determine when to script the base case. For example, a matrix data type may supply an add operator function that accepts a 2D DBL array and outputs a matrix. If a matrix is then added to a cluster of 2D DBL arrays, the output may be a cluster of matrices (as opposed, for example, to a cluster of 2D Arrays of matrices, which would be output if the aggregate handler used the base case of matrix+DBL).

In one embodiment, if the aggregate handler represents a primitive with Errors (e.g., waveform Add), then the output may be default data when there is an error, e.g., by using a case structure with a terminal set to "Make unwired terminal default".

Preserving Typedef Information

As noted above, in preferred embodiments, typedef information may be preserved or maintained for use in or by the aggregate handler. In one embodiment, in order to preserve typedef information, when a typedef is a cluster, it may be unbundled to handle individual components. These components may then be bundled together, e.g., via a Bundle node, and the resulting output compared with the original typedef. If the datatypes match exactly, the Input to the Bundle node may be wired, thereby maintaining the typedef information. If the data types do not match, the typedef may be removed.

Graphical User Interface Issues

In some embodiments, the above-described aggregate handler functionality may have consequences for the user interface of the development environment and/or the programs in which operator overloading is implemented. For example, in preferred embodiments, an aggregate handler for a base primitive operator may have the same representation as the base primitive operator. In other words, in the case of a graphical program implementation, the overloaded operator node (the aggregate handler) may be drawn exactly like the primitive operator node that it overloads.

In some embodiments, graphical program nodes may include "popup" menus or dialogs for configuring the node. In one embodiment, an aggregate handler's popup may include standard items (same as regular nodes), unless the overloaded primitive operator is a comparison primitive, in which, additional items may be include, such as, for example, "Compare Elements" and "Compare Aggregates" items (or equivalent), among others.

Thus, regarding new (user-defined) data types, for some primitive operators, containers or aggregates (e.g., arrays and clusters) with the new data type may also be wired to the primitive operator nodes, which may be overloaded for the new data types via the aggregate handler techniques described above, thus allowing for many variations of the new data to be wired to the primitive operator, e.g., an array of the data, a cluster of the data, a cluster with an array of the data, and so forth.

Thus, in various embodiments of the systems and methods described herein, a programming development environment and/or a programming language may include or facilitate automatic aggregate handling of overloaded operators, e.g., for user-defined data types.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium comprising program instructions implementing a program development environment, wherein the program instructions are executable by a processor to implement:
   creating a graphical program in response to user input, wherein the graphical program comprises a first plurality of interconnected nodes that visually indicate functionality of the program, wherein the graphical program includes an aggregate comprising a plurality of data elements of one or more data types, wherein the graphical program further includes an operator applied to the aggregate, wherein the operator comprises a node configured to invoke an intrinsic operator function, wherein at least one of the one or more data types comprises a user-defined data type, and wherein the user-defined data type specifies a user-defined operator function for the operator;
   automatically analyzing the aggregate to determine one or more operator functions implementing the operator for the plurality of data elements, including the user-defined operator function; and
   in response to said automatically analyzing, automatically generating executable code invoking the one or more operator functions for the plurality of data elements, including the user-defined operator function, wherein the executable code comprises a second plurality of interconnected nodes.

2. The memory medium of claim 1, wherein said automatically analyzing and said automatically generating comprises:
   for each data element in the aggregate:
      if said automatically analyzing determines that the data type of the data element specifies an operator function for the operator for the data type, automatically generating executable code invoking the operator function; and
      if said automatically analyzing determines that the data type of the data element does not specify an operator function for the operator,
         automatically determining if the data element is another aggregate;
         if the data element is another aggregate, performing said automatically analyzing and said automatically generating on the other aggregate;
         if the data element is not an aggregate, indicating an error.

3. The memory medium of claim 1, wherein the operator comprises an intrinsic operator, and wherein the user-defined operator function for the operator comprises an overloaded operator function for the operator.

4. The memory medium of claim 3, wherein the operator comprises a user-defined operator, and wherein the user-defined operator function for the operator comprises an overloaded operator function for the user-defined operator.

5. The memory medium of claim 1, wherein the aggregate comprises an array.

6. The memory medium of claim 1, wherein the aggregate comprises a cluster.

7. The memory medium of claim 1, wherein the operator comprises:
   a unary operator; or
   a binary operator.

8. The memory medium of claim 1, wherein the binary operator operates on the aggregate and one of:
   a different aggregate;
   a data element of an intrinsic data type; or
   a data element of a user-defined data type.

9. The memory medium of claim 1, wherein said automatically analyzing and said automatically generating are performed at compile-time.

10. The memory medium of claim 9, wherein said automatically analyzing and said automatically generating are performed as part of compiling the graphical program.

11. The memory medium of claim 1, wherein the program instructions are further executable to implement:
   executing the graphical program, wherein said executing the graphical program comprises executing the executable code invoking respective operator functions to apply the operator to each data element whose data type specifies an operator function for the operator.

12. The memory medium of claim 1, wherein said automatically analyzing and said automatically generating are performed for each aggregate in a recursive manner.

13. The memory medium of claim 1, wherein said automatically analyzing and said automatically generating are performed for each aggregate in an iterative manner.

14. The memory medium of claim 1, wherein the graphical program comprises a graphical data flow program.

15. The memory medium of claim 1, wherein the graphical program is operable to perform one or more of:
   an industrial automation function;
   a process control function; and
   a test and measurement function.

16. A computer-implemented method for aggregate handling of operator overloading, the method comprising:
   creating a graphical program in response to user input, wherein the graphical program comprises a first plurality of interconnected nodes that visually indicate functionality of the program, wherein the graphical program includes an aggregate comprising a plurality of data elements of one or more data types, wherein the graphical program further includes an operator applied to the aggregate, wherein the operator comprises a node configured to invoke an intrinsic operator function, wherein at least one of the one or more data types comprises a user-defined data type, and wherein the user-defined data type specifies a user-defined operator function for the operator;
   automatically analyzing the aggregate to determine one or more operator functions implementing the operator for the plurality of data elements, including the user-defined operator function, and
   in response to said automatically analyzing, automatically generating executable code invoking the one or more operator functions for the plurality of data elements, including the user-defined operator function, wherein the executable code comprises a second plurality of interconnected nodes.

17. A system for aggregate handling of operator overloading, the system comprising:
   a processor; and a memory medium coupled to the processor, wherein the memory medium comprises program instructions which are executable by the processor to:

create a graphical program in response to user input, wherein the graphical program comprises a first plurality of interconnected nodes that visually indicate functionality of the program, wherein the graphical program includes an aggregate comprising a plurality of data elements of one or more data types, wherein the graphical program further includes an operator applied to the aggregate, wherein the operator comprises a node configured to invoke an intrinsic operator function, wherein at least one of the one or more data types comprises a user-defined data type, and wherein the user-defined data type specifies a user-defined operator function for the operator;

automatically analyze the aggregate to determine one or more operator functions implementing the operator for the plurality of data elements, including the user-defined operator function, and automatically generate executable code invoking the one or more operator functions for the plurality of data elements, including the user-defined operator function, in response to said automatically analyzing, wherein the executable code comprises a second plurality of interconnected nodes.

18. A system for aggregate handling of operator overloading, the system comprising:

means for creating a graphical program in response to user input, wherein the graphical program comprises a first plurality of interconnected nodes that visually indicate functionality of the program, wherein the graphical program includes an aggregate comprising a plurality of data elements of one or more data types, wherein the graphical program further includes an operator applied to the aggregate, wherein the operator comprises a node configured to invoke an intrinsic operator function, wherein at least one of the one or more data types comprises a user-defined data type, and wherein the user-defined data type specifies a user-defined operator function for the operator;

means for automatically analyzing the aggregate to determine one or more operator functions implementing the operator for the plurality of data elements, including the user-defined operator function, and means for automatically generating executable code invoking the one or more operator functions for the plurality of data elements, including the user-defined operator function, in response to said automatically analyzing, wherein the executable code comprises a second plurality of interconnected nodes.

19. A computer-accessible memory medium comprising program instructions implementing a graphical program development environment, wherein the program instructions are executable by a processor to implement:

creating a graphical program in response to user input, wherein the graphical program comprises a first plurality of interconnected nodes that visually indicate functionality of the program, wherein the graphical program includes an aggregate comprising a plurality of data elements of one or more data types, wherein the graphical program farther includes an operator applied to the aggregate, and wherein the operator comprises a node configured to invoke an intrinsic operator function;

a) automatically analyzing the aggregate, b) in response to said automatically analyzing, for each data element in the aggregate:

b1) if said automatically analyzing determines that the data type of the data element specifies an operator function for the operator for the data type, automatically generating executable code invoking the operator function, wherein the executable code comprises a second plurality of interconnected nodes; and b2) if said automatically analyzing determines that the data type of the data element does not specify an operator function for the operator, automatically determining if the data element is another aggregate;

if the data element is another aggregate, performing a) and b) on the other aggregate;

if the data element is not an aggregate, indicating an error.

20. A computer-implemented method for aggregate handling of operator overloading, the method comprising:

creating a graphical program in response to user input, wherein the graphical program comprises a first plurality of interconnected nodes that visually indicate functionality of the program, wherein the graphical program includes an aggregate comprising a plurality of data elements of one or more data types, wherein the graphical program further includes an operator applied to the aggregate, and wherein the operator comprises a node configured to invoke an intrinsic operator function;

a) automatically analyzing the aggregate, b) in response to said automatically analyzing, for each data element in the aggregate:

b1) if said automatically analyzing determines that the data type of the data element specifies an operator function for the operator for the data type, automatically generating executable code invoking the operator function, wherein the executable code comprises a second plurality of interconnected nodes; and b2) if said automatically analyzing determines that the data type of the data element does not specify an operator function for the operator, automatically determining if the data element is another aggregate;

if the data element is another aggregate, performing a) and b) on the other aggregate;

if the data element is not an aggregate, indicating an error.

* * * * *